United States Patent
Knight et al.

(10) Patent No.: US 8,327,278 B2
(45) Date of Patent: Dec. 4, 2012

(54) SYNCHRONIZING METADATA DESCRIBES USER CONTENT UPDATES AND AN INDICATION OF USER GESTURES BEING PERFORMED WITHIN THE DOCUMENT, AND ACROSS CLIENT SYSTEMS USING DIFFERENT COMMUNICATION CHANNELS

(75) Inventors: Mark Rolland Knight, Bellevue, WA (US); Ethan Joseph Bernstein, Mercer Island, WA (US); Christopher J. Antos, Bellevue, WA (US); Jonathan Bailor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 534 days.

(21) Appl. No.: 12/371,932

(22) Filed: Feb. 17, 2009

(65) Prior Publication Data
US 2010/0211543 A1 Aug. 19, 2010

(51) Int. Cl.
*G06F 3/00* (2006.01)
*G06F 17/00* (2006.01)
*G06F 15/16* (2006.01)

(52) U.S. Cl. ........ 715/753; 715/234; 715/255; 707/610; 707/612; 709/203

(58) Field of Classification Search .................. 715/748, 715/230, 201, 205, 752, 234, 255, 753; 709/203, 709/206, 215–220; 705/342; 707/692–698, 707/705–711, 726–729, 740–746, 748–749, 707/609–612, 614–615
See application file for complete search history.

(56) References Cited

U.S. PATENT DOCUMENTS

| 5,671,428 A | * | 9/1997 | Muranaga et al. | ............ 715/751 |
| 5,862,325 A | * | 1/1999 | Reed et al. | ..................... 709/201 |
| 6,349,302 B1 | * | 2/2002 | Aoyama et al. | ........................ 1/1 |

(Continued)

FOREIGN PATENT DOCUMENTS
WO WO 2007/106851 * 9/2007
(Continued)

OTHER PUBLICATIONS

Tek-Jin Nam,, "The development and evaluation of Syco3D: a real-time collaborative 3D CAD system",Design Studies 22 (2001) 557-582.*

(Continued)

*Primary Examiner* — Srirama Channavajjala
(74) *Attorney, Agent, or Firm* — Hope Baldauff Hartman, LLC

(57) ABSTRACT

Tools and techniques for synchronizing metadata and document content across client systems using different communication channels are provided. These tools may define logical communication channels between client software components, and may allocate one of these channels to synchronizing updates to the contents of documents shared between these client components. These tools may allocate another one of the communication channels to synchronizing metadata between the client components, with the metadata describing activity pertaining to the shared documents. The client components may receive indications of activity made by users to the document contents, and may create metadata representing the activity. These client components may then transmit this metadata, using the further communication channel, to any number of other client components automatically in real time with the updates.

16 Claims, 5 Drawing Sheets

U.S. PATENT DOCUMENTS

| | | | |
|---|---|---|---|
| 6,446,093 B2 * | 9/2002 | Tabuchi | 715/255 |
| 6,633,910 B1 | 10/2003 | Rajan et al. | |
| 6,757,871 B1 * | 6/2004 | Sato et al. | 715/236 |
| 6,879,997 B1 * | 4/2005 | Ketola et al. | 709/208 |
| 7,127,501 B1 | 10/2006 | Beir et al. | |
| 7,529,780 B1 * | 5/2009 | Braginsky et al. | 1/1 |
| 2001/0042075 A1 * | 11/2001 | Tabuchi | 707/500 |
| 2002/0174180 A1 * | 11/2002 | Brown et al. | 709/203 |
| 2004/0085354 A1 * | 5/2004 | Massand | 345/751 |
| 2004/0107224 A1 * | 6/2004 | Bera | 707/203 |
| 2004/0177319 A1 * | 9/2004 | Horn | 715/501.1 |
| 2004/0193952 A1 | 9/2004 | Narayanan et al. | |
| 2004/0194025 A1 * | 9/2004 | Hubert et al. | 715/513 |
| 2005/0027755 A1 | 2/2005 | Shah et al. | |
| 2005/0033813 A1 * | 2/2005 | Bhogal et al. | 709/206 |
| 2005/0114359 A1 * | 5/2005 | Li et al. | 707/100 |
| 2006/0041589 A1 * | 2/2006 | Helfman et al. | 707/104.1 |
| 2006/0041601 A1 * | 2/2006 | Kim et al. | 707/201 |
| 2006/0123010 A1 | 6/2006 | Landry et al. | |
| 2006/0123347 A1 * | 6/2006 | Hewitt et al. | 715/748 |
| 2006/0136472 A1 | 6/2006 | Jujjuri et al. | |
| 2007/0016650 A1 | 1/2007 | Gilbert et al. | |
| 2007/0078904 A1 * | 4/2007 | Yoon et al. | 707/200 |
| 2007/0130229 A1 * | 6/2007 | Anglin et al. | 707/204 |
| 2008/0005120 A1 | 1/2008 | Li | |
| 2008/0189439 A1 | 8/2008 | Chitre et al. | |
| 2008/0282175 A1 * | 11/2008 | Costin et al. | 715/760 |
| 2009/0070285 A1 * | 3/2009 | Kobayashi | 707/1 |
| 2009/0125518 A1 * | 5/2009 | Bailor et al. | 707/8 |
| 2009/0157811 A1 * | 6/2009 | Bailor et al. | 709/204 |
| 2009/0228427 A1 * | 9/2009 | Friesenhahn et al. | 707/1 |

FOREIGN PATENT DOCUMENTS

| | | | |
|---|---|---|---|
| WO | WO 2007115149 | * | 10/2007 |
| WO | WO 2012058078 | * | 5/2012 |

OTHER PUBLICATIONS

Antonella Di Stefano et al. "SHARK, a Multi-Agent System to Support Document Sharing and Promote Collaboration",Proceedings of the 2004 International Workshop on Hot Topics in Peer-to-Peer Systems (HOT-P2P'04),2004, 8 pages.*

Yue Shi, Chun Yu et al. "Finger Gesture Interaction on Large Tabletop for Sharing Digital Documents among Multiple Users",2008 IEEE pp. 8-13.*

Reddy,et al."Multimedia Digital Library: Performance and Scalability Issues", Retrieved at<<http://manjunathbhatt.googlepages.com/mdl.pdf>>, pp. 5.

LakshmiPratha, Manujumath Mattam, Vamshi Ambati, and Raj Reddy, "Multimedia Digital Library: Performance and Scalability Issues ", 2006, Proc. of the Int'l Conf. for Universal Digital Library, Retrieved at http://manjunathbhatt.googlepages.com/mdl.pdf, pp. 5.

* cited by examiner

SYNCHRONIZING METADATA DESCRIBES USER CONTENT UPDATES AND AN INDICATION OF USER GESTURES BEING PERFORMED WITHIN THE DOCUMENT, AND ACROSS CLIENT SYSTEMS USING DIFFERENT COMMUNICATION CHANNELS

BACKGROUND

Traditionally, a user who wished to access functional capabilities provided by a given software application would install that application on a given computing system. Afterwards, the user could execute and run that software application as he or she saw fit, more or less on a stand-alone basis. However, over time, these software applications evolved, enabling multiple users to collaborate on a given document, without being limited to using a single computing system. Instead, these multiple users receive their own copies of the given document, as maintained locally on their own computing systems, and make edits to their local copies. Periodically, these edits to the local copies of the shared document are synchronized, so that all users may see what other users are doing in the shared document.

SUMMARY

Tools and techniques for synchronizing metadata and document content across client systems using different communication channels are provided. These tools may define logical communication channels between client software components, and may allocate one of these channels to synchronizing updates to the contents of documents shared between these client components. These tools may allocate another one of the communication channels to synchronizing metadata between the client components, with the metadata describing activity pertaining to the shared documents. The client components may receive indications of activity made by users to the document contents, and may create metadata representing the activity. These client components may then transmit this metadata, using the further communication channel, to any number of other client components automatically in real time with the updates.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
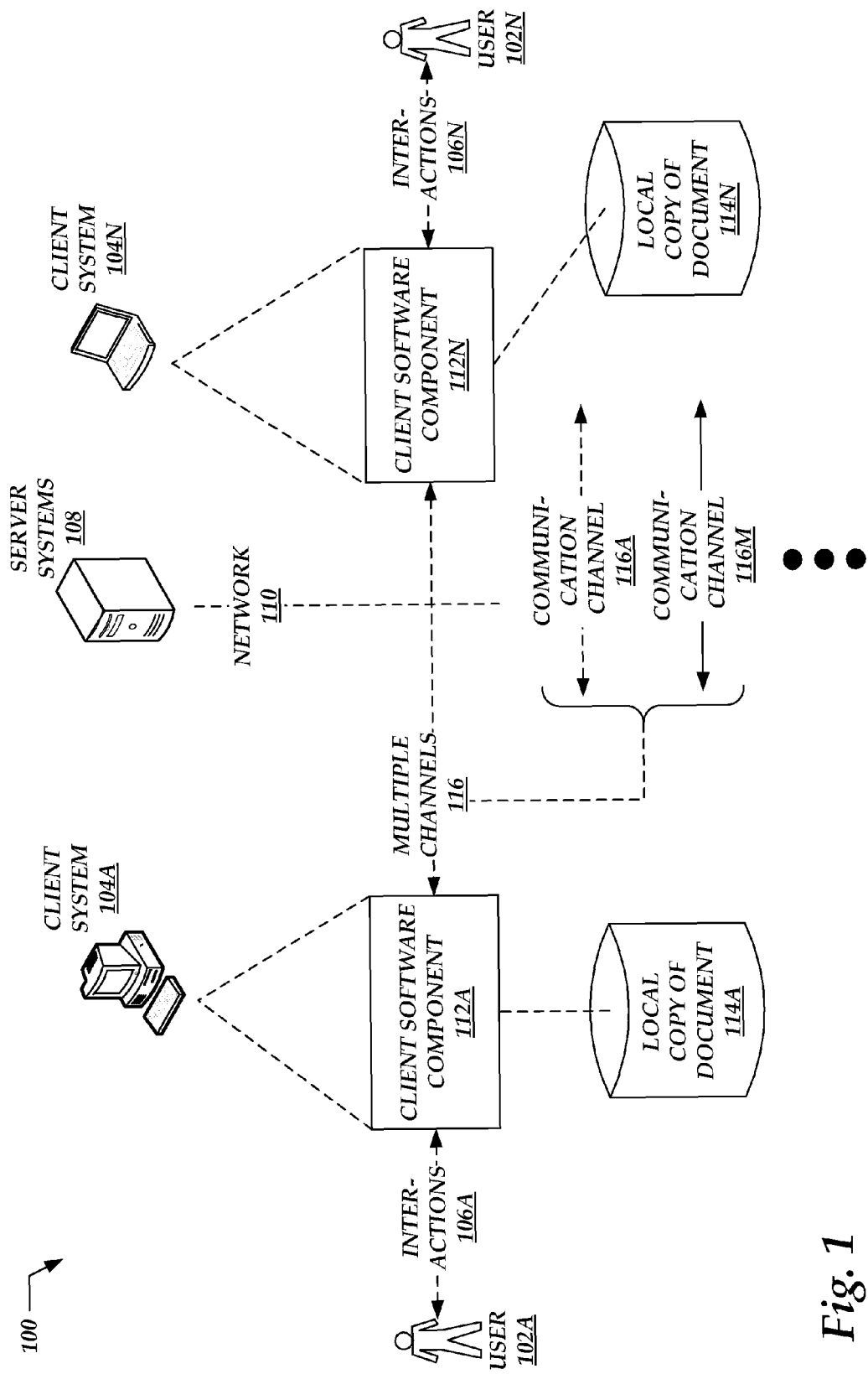
FIG. 1 is a combined block and flow diagram illustrating systems or operating environments suitable for synchronizing metadata and document content across client systems using different communication channels.

The following detailed description provides tools and techniques for synchronizing metadata and document content across client systems using different communication channels. While the subject matter described herein presents a general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The following detailed description refers to the accompanying drawings that form a part hereof, and that show, by way of illustration, specific example implementations. Referring now to the drawings, in which like numerals represent like elements through the several figures, this description provides various tools and techniques for synchronizing metadata and document content across client systems using different communication channels.

FIG. 1 illustrates systems or operating environments, denoted generally at 100, suitable for synchronizing metadata and document content across client systems using different communication channels. Turning to FIG. 1 in more detail, any number of users 102a and 102n (collectively, users 102) may interact with corresponding client systems 104a and 104n (collectively, client systems 104), as represented respectively at 106a and 106n (collectively, interactions 106). The client systems 104 may represent relatively stationary desktop computing systems (e.g., 104a), more mobile laptop or notebook-type computing systems (e.g., 104n), as well as other examples not shown in FIG. 1 in the interest of clarity. For example, these other examples may include smartphones, cellular telephones, wireless communications devices, and the like.

In some implementations, the systems or operating environments 100 may include server systems 108. The server systems 108 may be operatively located between the client systems 104a and 104n, serving as an intermediary through which communications between the client systems 104 may pass.

In addition, some implementations of the systems or operating environments 100 may include one or more intermediate communications networks 110. Turning to the networks 110 in more detail, these networks 110 may represent any number of communications networks. For example, the networks 110 may represent local area networks (LANs), wide area networks (WANs), and/or personal area networks (e.g., Bluetooth-type networks), any of which may operate alone or in combination to facilitate operation of the tools and techniques provided in this description. The networks 110 as shown in FIG. 1 also represents any hardware (e.g., adapters, interfaces, cables, and the like), software, or firmware associated with implementing these networks, and may also represent any protocols by which these networks may operate.

The graphical representations of the server systems 108 and the client systems 104 as presented in FIG. 1 are chosen only for convenience of illustration, but not to limit possible implementations. For example, suitable hardware environments may also include, but are not limited to: relatively stationary desktop computing systems; laptop notebook, or other relatively mobile computing systems; wireless communications devices, such as cellular phones, smartphones, wireless-enabled personal digital assistants (PDAs); or other similar communications devices. In addition, the tools and techniques described herein for indexing and querying data stores using concatenated terms may be implemented with hardware environments other than those shown in FIG. 1, without departing from the scope and spirit of the present description.

Turning to the client systems 104 in more detail, these client systems 104 may include one or more respective instances of client software components 112*a* and 112*n* (collectively, client software components 112). In the example shown in FIG. 1, the client software components 112*a* and 112*n* reside respectively within different physical client systems 104*a* and 104*n*. However, in some implementations of this description, multiple instances of the client software components 112*a* and 112*n* may reside on the same physical client systems 104. Examples of these latter implementations are illustrated and discussed further with FIG. 5 below.

The client software components 112*a* and 112*n* may represent any number of different types of application software that may be distributed across multiple client systems 104*a* and 104*n*. Without limiting possible implementations, this description provides examples in which the client software components 112 represented respective instances of a word processing or document editing application, as distributed to the client systems 104*a* and 104*n*. However, this example is provided only to facilitate the present description. More specifically, implementations of this description may incorporate other examples of the client software components 112, without departing from the scope and spirit of the present description.

In the example shown in FIG. 1, the client systems 104*a* and 104*n* may house or store respective copies of a shared or collaboratively edited document, as denoted at 114*a* and 114*n* (collectively, documents 114). In, for example, a word processing or document editing scenario, the interactions 106 performed with the users 102 may involve editing the local copies of the documents 114. Accordingly, the users 102*a* and 102*n* may perform different edits on their local copies of the documents 114.

As these local edits occur over time, the client systems 104*a* and 104*n* may exchange these local edits with one another, thereby synchronizing these edits between any number of client systems 104. More specifically, the client software components 112*a* and 112*n* may define a plurality of respective communication channels, denoted collectively at 116. More specifically, the communication channels 116 may include a first communication channel 116*a* adapted to exchange a first type of information between the client components 112*a* and 112*n*, and may also include at least another communication channel 116*m* adapted to exchange at least another type of information between the client components 112*a* and 112*n*. In general, references in this description to a "communication channel" are understood are understood to refer also to multiple communication channels.

Turning to the communication channels 116 in more detail, in example implementation scenarios, one of the communication channels 116*a* may be allocated to transferring only metadata between the client systems 104*a* and 104*n*. As described in further detail below, this metadata may represent the status of users 102*a* and 102*n* within their local copies of the documents 114*a* and 114*n*. However, the metadata transmitted along the communication channel 116*a* is distinguished from the actual changes in document content made respectively at the client systems 104*a* and 104*n*. In addition, the client software components 112 may automatically generate and transmit this metadata along the communication channel 116*a* in real time with the updates or changes to the document content, as those updates or changes occur on the respective client systems 104*a* and 104*n*.

The client software components 112 may also establish at least another communication channel (e.g., 116*m*), and may allocate this other communication channel 116*m* to transmitting actual updates to document content, as these updates occur on the client systems 104*a* and 104*n*. In a word processing or document editing scenario, the client software components 112*a* and 112*n* may, for example, generate and transmit these updates to the document content in response to the users 102 issuing an appropriate command. For example, when one of the users (e.g., 102*a*) issues a "save" command, the client software component 112*a* may respond to this save command by generating representations of updates made to the local copy of the document 114*a*, and transmitting these updates over the communication channel 116*m* to one or more other client systems 104*n*. In this manner, the client system 104*a* may synchronize or update the other client systems 104*n* with updates to document content that occur locally on the client system 104*a*.

Summarizing the above description, the communication channel 116*a* may be allocated to transport metadata that represents updates to the status of users within their local copies of the documents, while the communication channel 116*m* may be allocated primarily to transport the actual updates to the document content. In comparing the operational and performance characteristics of the multiple communication channels 116*a* and 116*m*, the communication channel 116*a* may operate as more of a "real time" communication channel, as compared to the communication channel 116*m*. Generally, the communication channel 116*a* may transmit metadata a higher frequency, as compared to the document updates transmitted along the communication channel 116*m*. Additionally, the instances of metadata transmitted along the communication channel 116*a* may be relatively small in size, as compared to the document updates that are transmitted along the communication channel 116*m*. Comparing the communication channels 116*a* to the communication channels 116*m*, the size of the data transmitted on these channels, the frequency with which data is transmitted along these channels, and what other clients do upon receiving data from these channels can vary. In addition, particular instances of the metadata as transmitted along the communication channel 116*a* may be associated with a relatively low priority, as compared to the document updates transmitted along the communication channel 116*m*.

Figure 2:
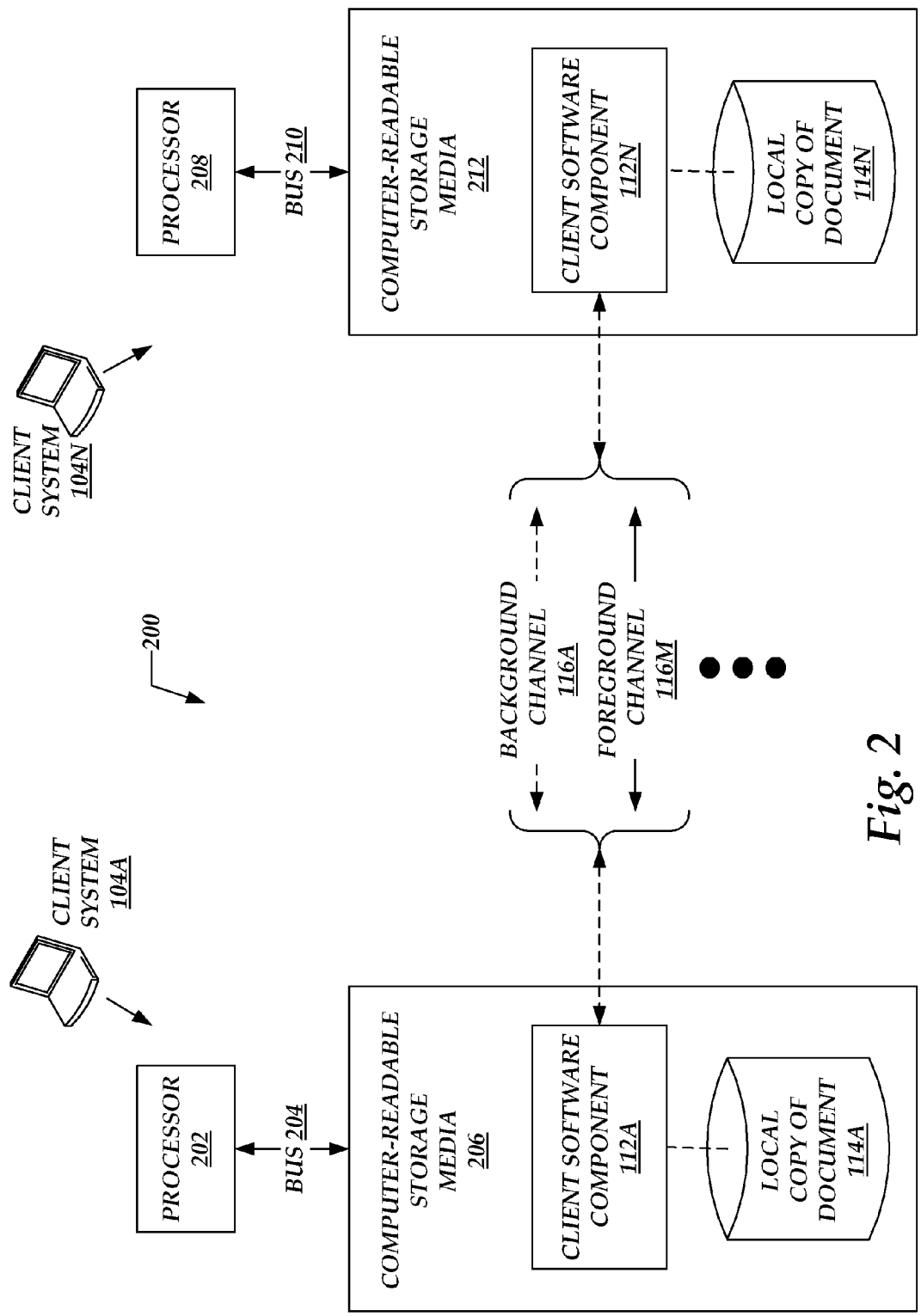
FIG. 2 is a combined block and flow diagram illustrating further details relating to client systems participating in the scenario shown in FIG. 1.

FIG. 2 illustrates further details, denoted generally at 200, relating to the client systems that participate in the scenarios represented in FIG. 1. FIG. 2 carries forward examples of the client systems at 104a and 104n. In addition, FIG. 2 omits the server systems 108, to represent implementations in which the client systems 104 operate in a peer-to-peer relationship, or operate in other scenarios that do not involve the server systems 108.

Turning to the client systems 104a in more detail, these client systems may include one or more processors 202, which may have a particular type or architecture, chosen as appropriate for particular implementations. The processors 202 may couple to one or more bus systems 204, having type and/or architecture that is chosen for compatibility with the processors 202.

The client systems 104a may also include one or more instances of computer-readable storage medium or media 206, which couple to the bus systems 204. The bus systems 204 may enable the processors 202 to read code and/or data to/from the computer-readable storage media 206. The media 206 may represent apparatus in the form of storage elements that are implemented using any suitable technology, including but not limited to semiconductors, magnetic materials, optics, or the like. The media 206 may include memory components, whether classified as RAM, ROM, flash, or other types, and may also represent hard disk drives.

The storage media 206 may include one or more modules of instructions that, when loaded into the processor 202 and executed, cause the client systems 104a to perform various techniques related to synchronizing metadata and document content across client systems using different communication channels. As detailed throughout this description, these modules of instructions may also provide various tools or techniques by which the client systems 104a may provide for synchronizing metadata and document content across client systems using different communication channels using the components, flows, and data structures discussed in more detail throughout this description. For example, the storage media 206 may include one or more software modules that implement the client software components 112a. In addition, the storage media 206 may contain local copies of one or more documents or other content, as carried forward at 114a.

Turning to the other client system 104n, this client system may also include one or more processors 208, which may or may not be of the same type and architecture as the processors 202. Otherwise, the above description of the processors 202 applies generally to the processors 208.

In addition, the client system 104n may include one or more bus systems 210, which may or may not be of the same type and architecture as the bus systems 204. Otherwise, the above description of the bus systems 204 applies generally to the bus systems 210.

The client system 104n may include any number of computer-readable storage media 212. In general, the above description of the storage media 206 applies generally to the storage media 212. As shown in FIG. 2, the storage media 212 may contain the client software component 112n, as well as the local copies of any shared documents 114n.

FIG. 2 also illustrates the communication channels 116a and 116m, carried forward from FIG. 1. It is noted that these drawing Figures illustrate two examples of the communication channels 116a and 116m only for convenience and clarity in providing this description. However, implementations of this description may include any convenient number (e.g., two or more) of communication channels 116. As suggested by the labeling in FIG. 2, the communication channel 116a may be implemented in connection with one or more background processes. Accordingly, the communication channel 116a may generally operate as a relatively low-priority background process, within the context of the client software components 112. On the other hand, the communication channel 116m may be implemented in connection with one or more foreground processes. Accordingly, the communication channel 116m may generally operation as a relatively high-priority foreground process, within the context of the client software components 112.

Figure 3:
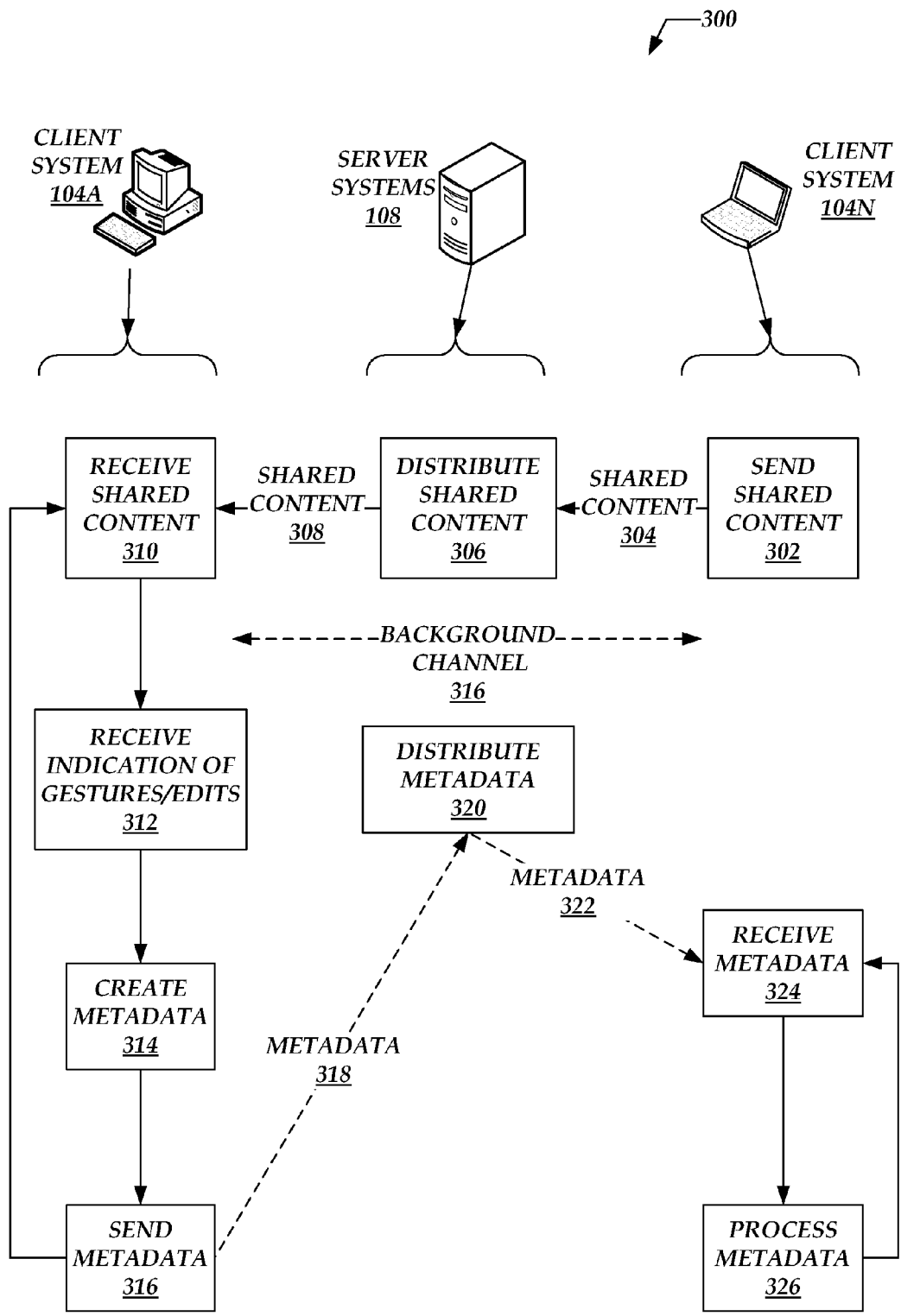
FIG. 3 is a flow diagram illustrating components and process flows involved with synchronizing metadata and document content across client systems using different communication channels.

FIG. 3 illustrates components and process flows, denoted generally and collectively at 300, involved with synchronizing metadata and document content across client systems using different communication channels. For convenience of description, but not to limit possible implementations, the process flows 300 are described in connection with particular functions performed by client systems (e.g., as carried forward at 104a and 104n) and server systems (e.g., as carried forward at 108). However, it is noted that implementations of the process flows 300 may be performed on other components or systems, without departing from the scope and spirit of the present description. In addition, implementations of these process flows 300 may or may not operate in connection with the server systems 108. In implementations that omit the server systems 108, the functions allocated to the server systems 108 in this description may be distributed to the client systems 104.

Turning to the process flows 300 in more detail, a given client system (e.g., 104n) may share given content (e.g., documents or files) with one or more other client systems (e.g., 104a). In some cases, the client system 104n may enable the other client systems 104a to edit local copies of this content. Accordingly, block 302 represents sending shared content from an originating client system (e.g., 104n) to one or more destination client systems (e.g., 104a). FIG. 3 denotes at 304 the shared content as transmitted from the originating client system 104n.

In implementations that incorporate the server systems 108, block 306 represents distributing the shared content 304 as received from the originating client system 104n to one or more destination client systems 104a. FIG. 3 denotes at 308 the shared content as distributed by the server systems 108 to any number of the destination client systems 104a.

At the destination client systems 104a, block 310 represents receiving the shared content 308. Having received the shared content 308, the client systems 104a may enable users (e.g., 102a in FIG. 1) to interact with the shared content 308. For example, these users 102a may view, edit, or otherwise interact with the shared content 308.

Block 312 represents receiving indications of gestures related to user activity directed to the shared content 308. For example, a given user 102a may scroll to a given page within shared content 308, and place a cursor or other insertion point within a paragraph on that page. By these actions, the user 102a may be preparing to edit content within that paragraph.

Block 314 represents creating metadata in response to the indications of gestures received in block 312. For example, the metadata created in block 314 may indicate that a user associated with the client system 104a is editing within a given region of the shared content 308. However, as discussed in further detail below, the metadata created in block 314 may take other forms or examples, without departing from the scope and spirit of the present description.

Block 316 represents the client system 104a sending the metadata created in block 314. FIG. 3 denotes at 318 the metadata as transmitted by the client system 104a. Afterwards, the portions of the process flows 300 as performed on the client systems 104a may return to block 310, as represented by the arrow connecting blocks 316 and 310. In this manner, the client systems 104a may perform blocks 310-316 in response to any number of gestures or other actions directed to the shared content 308, thereby generating metadata 318 substantially and real-time the occurrence of such gestures or other actions.

In the example shown in FIG. 3, the server systems 108 may receive the metadata 318. In turn, the server systems 108 may distribute the metadata 318 to any number of other client systems 104n, as represented by block 320. FIG. 3 denotes at 322 the metadata as distributed to the other client systems 104n. However, in implementations that omit the server systems 108, the metadata 318 may pass directly to any number of the other client systems 104n.

Referring to the client system 104n, block 324 represents receiving the metadata 322. In some implementation scenarios, block 324 may include receiving the metadata via the server systems 108. In those implementations that omit the server systems 108, block 324 may include receiving the metadata directly from the client system 104a that generated the metadata.

Block 326 represents processing the metadata received in block 324. For example, continuing the above example relating to document edits, the metadata 322 may indicate that another user on the client system 104a is editing within a given region of a document shared between the client systems 104a and 104n. In this scenario, block 326 may include applying a lock or other similar restrictive mechanism to that region of the document, as it exists in the local copy of that document on the client system 104n. In this manner, the client system 104n may reduce the risk of creating local edits a conflict with that is created on the client system 104a. However, in providing this example, it is noted that implementations of this description may provide other processing represented by block 326, without departing from the scope and spirit of the present description.

Additional examples of the metadata 318/322 may include information indicating which users (e.g., 102 in FIG. 1) are accessing a given document at a given time. The metadata 318/322 may also indicate where changes are occurring within a given document at a given time, and may also indicate where different users are editing at a given time. Other examples of the metadata may include comments entered by users that relate to document content, without affecting the document content itself or the layout of the document. In general, the metadata 318/322 may represent real-time state information related to collaboration within the document, as distinguished from the document content itself.

In addition, the metadata 318/322 may express a high-level view of what different given users are doing within a shared document. For example, the metadata may indicate that a given user is editing existing content, while another user is adding new content, and another user is formatting or reformatting some portion of the document.

As represented by the arrow connecting blocks 326 and 324, that portion of the process flows 300 that are performed by the client system 104n may return to block 324 to await arrival of the next metadata from other client systems 104a, or from the server systems 108. As appreciated from FIG. 3, blocks 324 and 326 may be repeated any number of times to process different instances of incoming metadata 318/322.

As indicated in FIG. 3, the metadata 318/322 may be transmitted along the "background" channel 116a. Accordingly, the metadata 318/322 may be transmitted at a relatively low-priority. For example, if multiple client systems 104 attempt to transmit conflicting metadata at the same time, the server systems 108 may serialize these incoming metadata updates using any appropriate techniques, thereby selecting a "winner" from among these conflicting updates. The "losing" metadata update may then be resubmitted afterwards.

Figure 4:
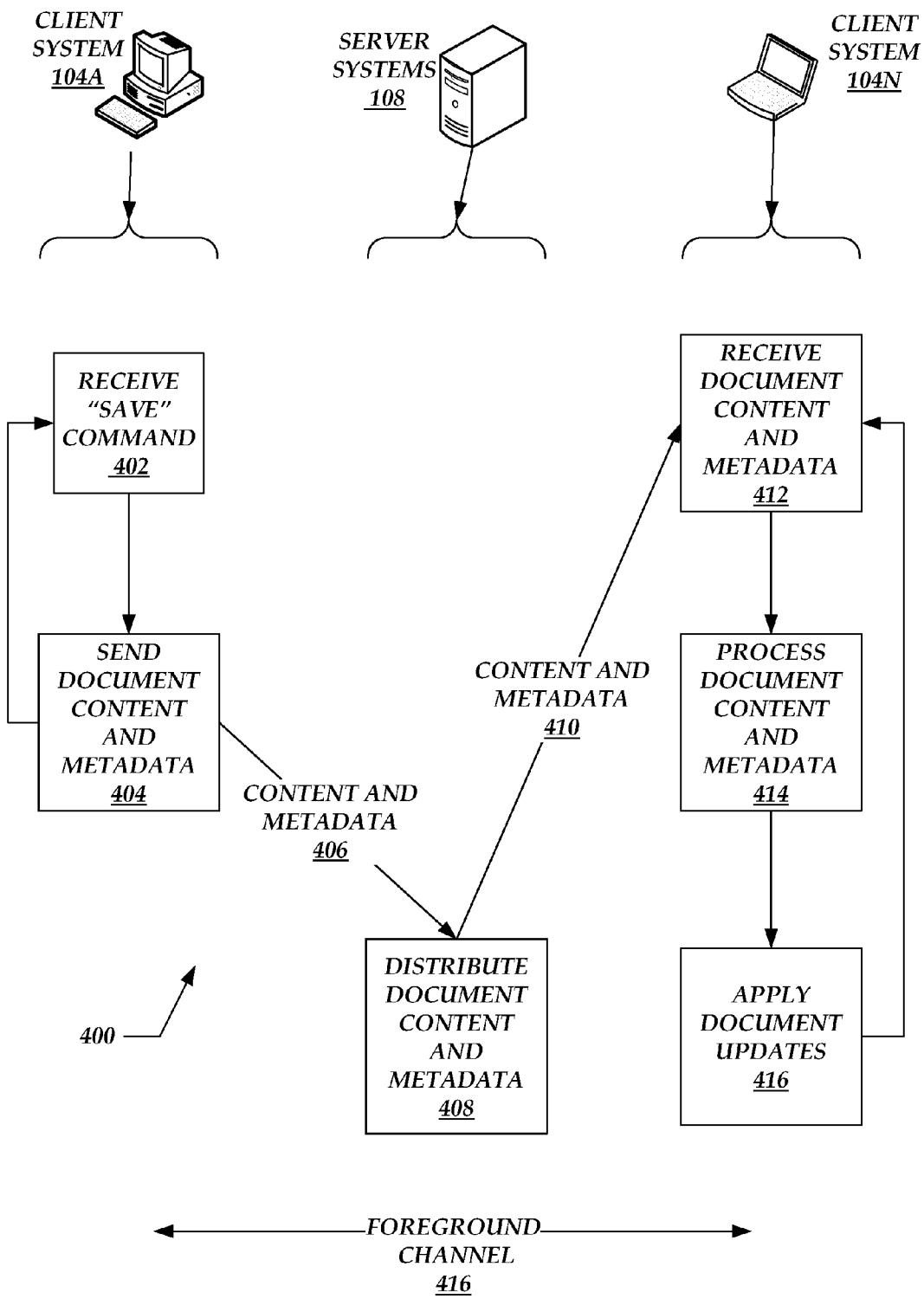
FIG. 4 is a flow diagram illustrating components and additional process flows involved with synchronizing metadata and document content across client systems using different communication channels.

FIG. 4 illustrates components and additional process flows, denoted generally at 400, involved with synchronizing metadata and document content across client systems using different communication channels. For convenience of description, but not to limit possible implementations, FIG. 4 carries forward the client systems 104a and 104n, and the server systems 108. More specifically, the process flows 400 may be suitable for transmitting updates to document content, while the process flows 300 shown in FIG. 3 may be suitable for automatically transmitting metadata updates.

Turning to the process flows 400 in more detail, block 402 represents a given client system (e.g., 104a) receiving an indication that a user accessing that client system has issued a given command. One non-limiting example of such a command is a "save" command, in the context of a document editing or word processing application running on the client system 104a.

Block 404 represents sending updated document content in response to the command indicated in block 402. For example, a given user (e.g., 102a in FIG. 1) may interact with the client system 102a in performing a word processing or document editing task. At any convenient point during this task, this user may issue a suitable command (e.g., the save command discussed above), as indicated in block 402. In response to this command, the client system 104a may send updated document content, as represented generally at 406. In some cases, block 404 may also include sending updated metadata along with the updated document content, as also represented at 406.

As indicated by the arrow linking block 404 to block 402, the client system 104a may repeat the processing represented in blocks 402 and 404 any number of times. For example, the process flows 400 as performed by the client system 104a may cycle through the processing represented in blocks 402 and 404 in response to the user activating the command indicated in block 402. In some implementations of this description, some of the channels described herein may only automatically send and/or automatically receive applicable channel data from other clients. However, other channels may only manually send and/or receive applicable channel data from other clients.

In the example shown in FIG. 4, the updated content and metadata 406 may be routed to the server systems 108. In turn, the server systems 108 may distribute the updated document content and metadata, as represented generally at block 408. In those implementations that include the server systems 108, the content and metadata distributed via those server systems are denoted at 410.

As described above, some implementations may omit the server systems 108. In those cases, the updated document content and metadata 406 may flow directly from the client system 104a to one or more other client systems (e.g., 104n).

At an example client system 104n, block 412 represents receiving the document content and metadata updates 406/410. In turn, block 414 represents processing the updated document content and metadata. For example, continuing the above example related to document editing or word processing, block 414 may include processing metadata that indicates that a given user accessing the client system 104a is no longer editing within a given region of a document that is shared between the client systems 104a and 104n. Accordingly, block 414 may include releasing any locks or other restrictive mechanisms previously applied to that given region in response to the given user editing within that region.

Once such blocks or other restrictive mechanisms are released, users accessing other client systems (e.g., 104n) are then able to edit within that region, thereby obtaining locks in their favor within that region.

Block 416 represents applying document updates received in the content and metadata updates 406/410 to a local copy of the document (e.g., 114n in FIG. 1), stored locally at the client system 104n. In this manner, the process flows 300 and 400 shown in FIGS. 3 and 4 may operate to provide improved techniques for synchronizing metadata and document content across a plurality of different client systems 104a and 104n. It is noted that the process flows 300 and 400 are shown separately in FIGS. 3 and 4 only for clarity of illustration, but not to limit possible implementations of this description. In addition, as shown in FIG. 4, the updates to the document content and metadata 406/410 may be transmitted along the example foreground channel 116m. As indicated by the arrow traveling from block 416 to block 412, those portions of the process flows 400 as performed by the client system 104n may repeat for any number of content/metadata updates 406/410 as received by the client system 104n.

Having provided the foregoing description of FIGS. 3 and 4, several observations are noted for the purposes of summarizing this description, but not to limit possible implementations of this description. As described above, the information that is conveyed along the background channels 116a may be primarily or exclusively updates to metadata associated with documents, files, or other content shared between a plurality of client systems 104. On the other hand, the information that is conveyed along the foreground channels 116m may include updates to document content and accompanying metadata.

Comparing the updates transmitted along the background channels 116a to the updates transmitted along the foreground channels 116m, the updates sent along the background channels 116a typically real-time metadata updates, which are sent automatically at a relatively high-frequency over time. In addition, each particular instance of the updates transmitted along the background channels 116a is relatively small. For example, the client systems 104 may generate metadata updates in response to several keystrokes entered by a user, or in response to the user selecting or navigating to particular regions in the shared document, and send these updates along the background channels 116a.

In some cases, multiple client systems 104 may attempt to upload conflicting metadata updates along the background channel 116a. These metadata updates may "conflict" or "collide" in the sense that they occur at approximately the same time, in the sense that they really to the same portions of a shared document, or may conflict for other reasons. Due to the high frequency of these updates along the background channel 116a, collisions may be more likely a long this channel, as compared to the foreground channel 116m. However, even if collisions do occur between different client systems 104, the relatively small size of the conflicting metadata updates may minimize the overall impact to the client systems 104. In other words, the client systems 104 would not generally devote substantial processing bandwidth and resources to transmitting or even retransmitting these metadata updates. If collisions do occur along the background channel 116a, these metadata updates may readily be retransmitted, at the cost of some level of increased latency along the background channel 116a.

On the other hand, the client systems 104 may generate and send updates along the foreground channels 116m in response to discrete actions occurring on different ones of the client systems 104 (e.g., manual "save" commands). Accordingly, the updates sent along the foreground channels 116m may be sent much less frequently, as compared to the background channels 116a. Because updates are sent much less frequently along the foreground channels 116m, as compared to the background channels 116a, collisions along the foreground channels 116m are less likely. Typically, information sent along the foreground channels 116m may be regarded as having higher priority, as compared to information sent along the background channels 116a. Therefore, the reduced likelihood of collision along the foreground channels 116m may be beneficial, particularly when transmitting relatively high priority information.

Referring briefly back to the background channels 116a, in a worst-case scenario, a given client system 104 may be extraordinarily "unlucky", in the sense that metadata updates originating at that given client system 104 may repeatedly "lose" due to conflicts occurring along the background channel 116a. However, at some point, this given client system 104 may receive an action (e.g., a save command) that results in generating an update along the higher-priority foreground channels 116m. When this given client system 104 is able to update and synchronize along the foreground channels 116m, the updates sent along those channels may incorporate any previous "losing" metadata updates. Thus, in this worst-case scenario, the given client system 104 may wait for a higher-priority update to send along its metadata updates.

Figure 5:
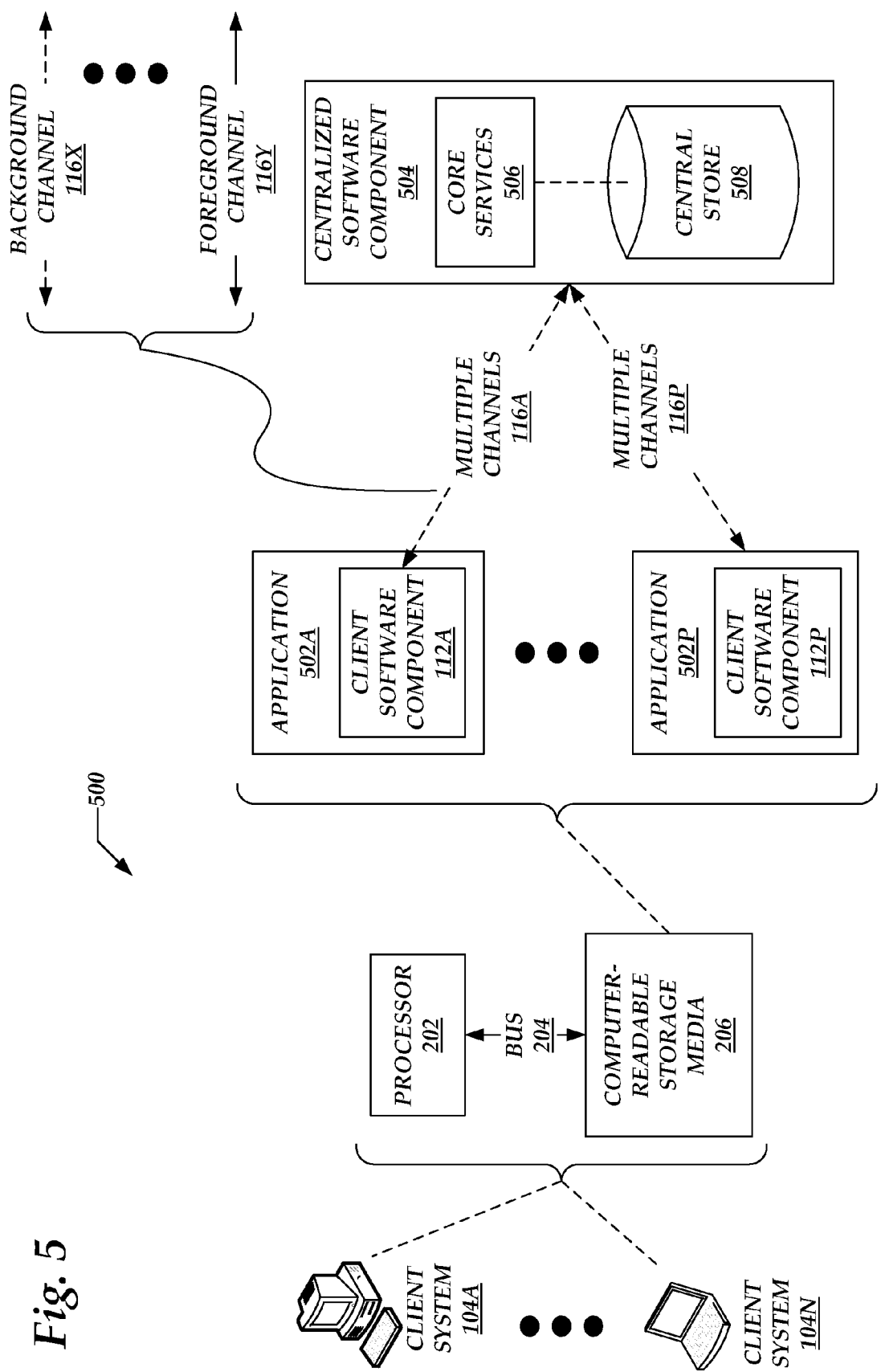
FIG. 5 is a combined block and flow diagram illustrating additional examples systems or operating environments, suitable for synchronizing metadata and document content across client systems using different communication channels.

FIG. 5 illustrates additional examples systems or operating environments, denoted generally at 500, suitable for synchronizing metadata and document content across client systems using different communication channels. Comparing FIG. 5 to FIG. 1, FIG. 1 illustrates scenarios in which the multiple communication channels 116 link different physical client systems 104a and 104n with one another. However, FIG. 5 illustrates scenarios in which the multiple communication channels 116 link different components with one another, within a single physical client system 104a or 104n.

For ease of reference and convenience of description, FIG. 5 carries forward a representative processor 202, bus system 204, and computer-readable storage medium 206. In the example shown in FIG. 5, the computer-readable storage medium 206 may include multiple different instances of application software 502a and 502p (collectively, application software or applications 502). The computer-readable storage medium 206 may also include one or more instances of a centralized software component 504.

In general, this centralized software component 504 may provide some functional capability on behalf of the different applications 502. As an illustrative but non-limiting example, the centralized software component 504 may provide an instant messaging (IM) capability, which is integrated into the applications 502. This IM capability may support the creation of a "forum" or other shared communication facilities associated with a given document being edited by multiple authors. These authors may post IMs to this forum while editing the document using the application software. The forum may contain a copy of the document content, on which the authors may comment, in addition to exchanging emails, IMs, or other forms of communication relating to the document.

To facilitate the foregoing processing, the centralized software component 504 may provide a set of core services 506, which are offered to the various applications 502. In addition, the centralized software component may maintain a central store 508 that is associated with the core services 506. Returning to the IM example, the core services 506 may represent application program interfaces (APIs) or other functions through which the applications 502 may access IM capability.

In addition, central store 508 may store temporary or persistent information relating to IM interactions conducted through the applications 504.

Regarding the applications 502, the application 502a may include a client software component 112a, and the application 502p may include a client software component 112p. In general, the above description directed to the client software components 112 applies equally to the client software components 112a and 112p (collectively, client software components 112). In addition, the client software components 112a and 112p and the centralized software component 504 may establish respective multiple communication channels 116a and 116p. More specifically, the multiple communication channels 116a may link the client software component 112a with the centralized software component 504, while the multiple communication channels 116p may link the client software component 112p with the centralized software component 504.

Turning to the multiple communication channels 116a and 116p in more detail, the above description of the communication channels 116 generally applies equally to these communication channels 116a and 116p as shown in FIG. 5. More specifically, the communication channels 116a and 116p may implement any number of "foreground" channels 116y, and may implement any number of "background" channels 116x. In general, the foregoing description of the foreground and background channels applies equally to the channels 116x and 116y. For example, the client software components 112a and 112p may send metadata related to ongoing IMs along the background channels 116x, and may send completed IMs along the foreground channels 116y.

As an example of the foregoing processing, a user of the client systems 104 may access the application 502a. In addition, the user may invoke the client software component 112a to generate and send an IM from within the application 502a. The client software component 112a may present a suitable user interface (UI), and the user may begin typing the IM into this UI. As the user types into this UI, the client software component 112a may generate metadata related to these keystrokes, and may transmit this metadata along the background channel 116x to the centralized software component 504. In turn, the core services component 506 may load this metadata into the central store 508. By monitoring the centralized software component 504, other applications 502p may become aware of interactions between the application 502a and the centralized software component 504. When the user on the client system 104 has completed the IM, he or she may invoke a "send" command. In response to this command, the client software component 112a may transmit the completed IM along the foreground channel 116y, along with any updated metadata.

The foregoing description provides technologies for routing users to receive online services based on scores indicating online behavior. Although the this description incorporates language specific to computer structural features, methodological acts, and computer readable media, the scope of the appended claims is not necessarily limited to the specific features, acts, or media described herein. Rather, this description provides illustrative, rather than limiting, implementations. Moreover, these implementations may modify and change various aspects of this description without departing from the true spirit and scope of this description, which is set forth in the following claims.

We claim:

1. An apparatus comprising at least one computer-readable storage medium having stored thereon computer-executable instructions that, when loaded into a processor and executed, cause the processor to:

define a plurality of logical communication channels between a client component and a server component;

allocate at least a first one of the communication channels for synchronizing an update to contents of a document that is shared between the client component and another client component;

allocate at least a further one of the communication channels for synchronizing a first metadata between the client component and the server component, wherein the first metadata describes user content updates and an indication of user gestures being performed within the document;

receive an indication of at least one instance of activity pertaining to the contents of the document by a user accessing the client components;

create the first metadata representing the activity;

transmit the first metadata, using the further communication channel, from the client component to the server component automatically in real-time with the update; and receive a command from the user, and in response to the command, transmit the document contents and a second metadata representing a state of the document from the client component to the server component using the first communication channel.

2. The apparatus of claim 1, further comprising instructions to transmit the document contents to the another client component via the server component.

3. The apparatus of claim 1, wherein the instructions to receive the command include instructions to receive a command to save a current state of the document.

4. The apparatus of claim 1, further comprising instructions to instantiate a foreground process for transmitting updates to the document contents using the first communication channel, and further comprising instructions to instantiate a background process for transmitting the first metadata using the further communication channel.

5. The apparatus of claim 1, further comprising instructions to transmit the first metadata to another client component via at least one server component.

6. The apparatus of claim 1, wherein the indication of user gestures being performed on the document further includes information specifying a particular region of the document where a user is currently editing.

7. An apparatus comprising at least one computer-readable storage medium having stored thereon computer-executable instructions that, when loaded into a processor and executed, cause the processor to:

define a plurality of logical communication channels to a client component;

allocate at least a first one of the communication channels for synchronizing an update to contents of a document that is shared between the client component and another client component;

allocate at least a further one of the communication channels for synchronizing a first metadata between the client component and the another client component, wherein the first metadata describes user content updates and an indication of user gestures being performed within the document;

receive the first metadata from the client component via the further communication channel, wherein the first metadata relates to a first copy of the document content on the client component;

process the first metadata to assess any impact to a further copy of the document content that is maintained locally at the client component;

receive, via the first communication channel from the client component, at least one update to the first copy of the document contents and a second metadata; and apply the update and the second metadata received via the first communication channel to a further first copy of the document content.

8. The apparatus of claim 7, wherein the instructions to receive an update include instructions to receive the update to the document content in response to a command issued by a user accessing the client component.

9. The apparatus of claim 7, wherein the instructions to receive the update include instructions to receive the update to the document content in response to a save command issued by a user accessing the client component.

10. The apparatus of claim 7, wherein the instructions to receive the first metadata include instructions to receive metadata created and transmitted automatically by the client component in real time with the update.

11. The apparatus of claim 7, further comprising instructions to receive the first metadata from the client component via at least one server component.

12. The apparatus of claim 7, wherein the indication of user gestures being performed on the document further includes information specifying a particular region of the document where a user is currently editing.

13. A system comprising:
a first client system including at least a first processor and at least a first computer-readable storage medium coupled to communicate with the first processor, wherein the first storage medium includes at least a first client software component for maintaining a first copy of a document locally at the first client system;

at least a second client system including at least a second processor and at least a second computer-readable storage medium coupled to communicate with the second processor, wherein the second storage medium includes at least a second client software component for maintaining a second copy of the document locally at the second client system;

a first logical channel placing the first and second client software components in communication with one another, wherein the first logical channel is adapted for synchronizing a first metadata between the first and second client software components, wherein the first metadata represents user content updates and an indication of user gestures being performed within the first or second copies of the document, and wherein the first metadata is generated and transmitted in real time with occurrences of the user content updates and the indication of user gestures; and at least a second logical channel placing the first and second client software components in communication with one another, wherein the second logical channel is adapted for synchronizing at least one update to the document comprising changes to the document contents and a second metadata in response to a least one command issued by a user accessing the first or second client system.

14. The system of claim 13, wherein the first and second client software components are respective instances of a document editing application.

15. The system of claim 13, wherein the first logical channel is adapted to operate with least one background process that synchronizes the first metadata between the first and second client systems, and wherein the second logical channel is adapted to operate with a least one foreground process that synchronizes the least one update to the document and the second metadata between the first and second client systems.

16. The system of claim 13, wherein the indication of user gestures being performed on the document further includes information specifying a particular region of the document where a user is currently editing.

* * * * *